Sept. 8, 1959  W. W. McKENZIE  2,903,101
ANTI-SKID BRAKE MECHANISM
Filed March 9, 1955  4 Sheets-Sheet 2

INVENTOR
William W. McKenzie
By Fetherstonhaugh & Co.
Attorneys

Sept. 8, 1959    W. W. McKENZIE    2,903,101
ANTI-SKID BRAKE MECHANISM
Filed March 9, 1955    4 Sheets-Sheet 3

INVENTOR
William W. McKenzie

By Fetherstonhaugh & Co.

Attorneys

Inventor
William W. McKenzie
By Fetherstonhaugh & Co
Attorneys

United States Patent Office 2,903,101
Patented Sept. 8, 1959

2,903,101

ANTI-SKID BRAKE MECHANISM

William Wright McKenzie, Rosemere, Quebec, Canada, assignor to Canadair Limited, Montreal, Quebec, Canada Application March 9, 1955, Serial No. 493,201

8 Claims. (Cl. 188—181)

This invention relates to improvements in anti-skid brake mechanisms and more particularly to anti-skid brake mechanisms as applied to aircraft landing wheel assemblies.

The invention consists essentially in the provision of means whereby, on the loss of high pressure main supply hydraulic fluid, supply of fluid under operational pressure in the braking system is maintained for use in emergency conditions and the brake-pedal travel is held down to a minimum even on repeated operation of the brakes to correct anti-skid, without loss of operational fluid pressure.

Under present conditions where the hydraulic operating pressures for the wheel brake system is supplied to the brakes via a boost-cylinder-type brake valve, continued manual operation of the boost piston by the foot brake pedal on failure of the high pressure system causes the hydraulic pressure in the boost cylinder to be rapidly exhausted. As the hydraulic fluid in the boost cylinder is exhausted, excessive travel of the foot brake pedal takes place. This excessive travel of the foot brake has a disconcerting effect on the pilot, particularly when landing conditions are such that skid effects have to be overcome, necessitating rapid application and release of the wheel brakes under emergency conditions. It is just under such conditions that the boost cylinder supply of pressure hydraulic fluid exhausts itself at a rapid rate. Such a boost-cylinder type brake valve could be of the type disclosed in United States Patent No. 2,676,465 and the present invention takes the form of added mechanism to such a device in order to overcome the above stated difficulties.

The present invention has for its object the provision of means whereby the return flow from the brakes via the exhaust valve of the anti-skid unit to the reservoir is cut off on failure of the main high pressure hydraulic supply thereby retaining the full capacity of the boost cylinder type brake valve for emergency foot brake operation.

A further object of the invention is to provide means whereby the return fluid from the brakes, when operating under emergency conditions, is returned to the boost cylinder for instant re-application.

A further object of the invention is to provide means whereby an anti-skid mechanism applied to aircraft landing wheels can successfully be incorporated with the boost cylinder-type brake system to overcome the failures inherent in the boost cylinder operation from rapid relieving and re-applying brake pressure under action of the anti-skid device.

A further object of the invention is to give a measure of increased confidence to the aircraft pilot by maintaining the brake system in a condition whereby full brake operation is maintained during emergency operation with only a short travel of the brake foot pedal far short of the maximum.

Referring to the drawings—

Figure 1:
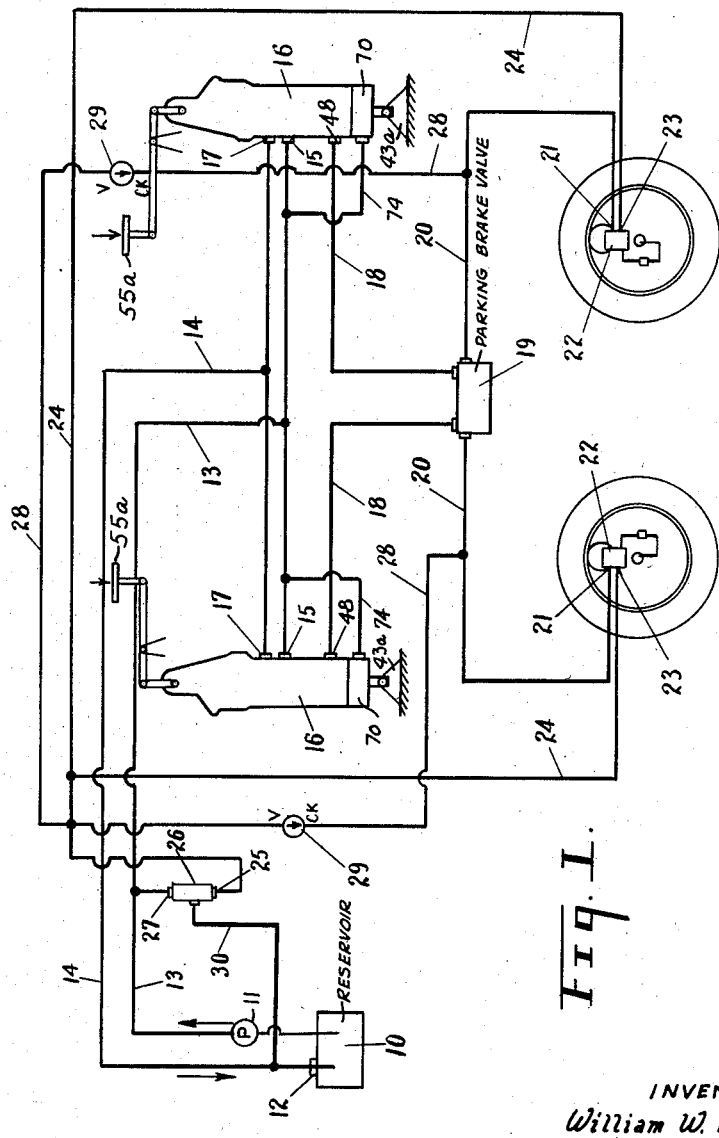
Figure 1 is a line diagram of an aircraft hydraulic brake system including anti-skid devices and the improvements incorporated therewith as set forth in the following specification.
Figure 2:
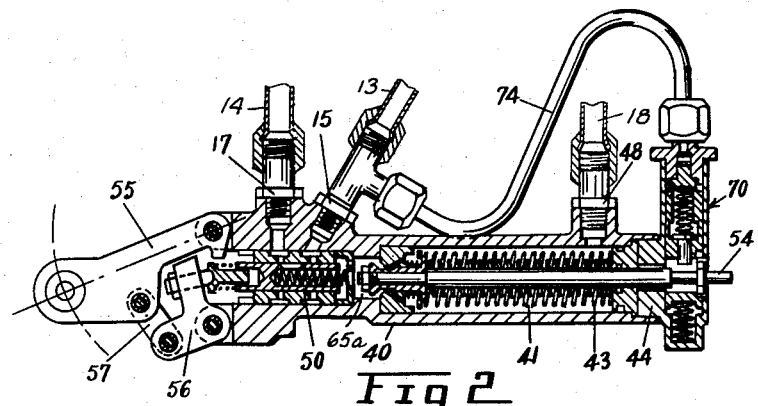
Figure 2 is a longitudinal sectional view of a modified hydraulic system boost cylinder incorporating a piston rod lock device and showing the mechanism in the unlocked position and the brake pedal connection in the retarded or free position.

Referring first to the line diagram shown in Figure 1 of the drawings. The installation shown is applied to aircraft wheel brake system incorporating an anti-skid unit, and for the purpose of description and illustration, an anti-skid unit of the "Maxaret" type is shown. However, it is clearly understood that the "Maxaret" type of anti-skid unit could equally well be replaced by any other type of anti-skid unit acting on the hydraulic brake system in a similar manner.

The hydraulic reservoir 10 is provided with a return inlet 12 to which the return line 14 is connected. The feed line 13 from the reservoir 10 is fed under pressure by the pump 11 through the inlet 15 of the boost-cylinder-type brake valve 16 while the return line 14 connects with the outlet 17 of the brake valve 16.

The control line 18 leads from the connection 48 of the boost cylinder brake valve 16 through the parking brake valve 19 which is standard equipment and does not form an active part of this invention. From the parking brake valve 19, the control line 18 has a branch 20 leading to the inlet connection 21 of the anti-skid unit 22. The return connection 23 connects with the return line 24 leading to the connection 25 of the pressure-operated valve 26, the opposite end of which has a connection 27 leading back to the feed line 13. A line 28 connects the line 24 with the line 20, on both sides of the parking brake valve 19 and is provided with the check valves 29 to allow flow of fluid in one direction only from the line 24 to the line 20. A third connection 30 on the valve 26 is connected to the return line to the reservoir 10.

Figure 8:
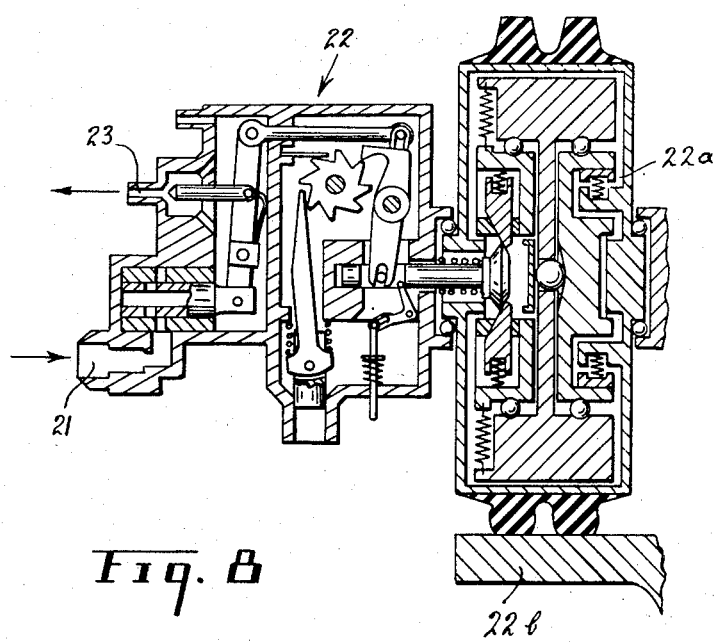
Figure 8 is a vertical cross section of the anti-skid device shown in contact with a rim on the wheel of the aircraft, with the device in operative position taken when the aircraft is about to land.

In Figure 8 a typical anti-skid unit 22 is shown in section with the mechanism of the device shown in the operative position taken when the aircraft is about to land and showing its tire and flywheel assembly 22a in contact with the landing wheel rim 22b.

The reference numerals in the above described diagram will be referred to where equivalent parts are described in the following description of the detail mechanism and in the operation of the invention.

The boost cylinder control valve 16 is a well known type to which have been added a piston rod lock device. The original valve comprises a selector valve section and a boost cylinder section within the casing 40. The boost cylinder 41 houses a piston head 42 to which is slidingly attached the piston rod 43 which passes out of the cylinder 41 through the end block 44. On the inner end of the piston rod 43 is a valve poppet 45 which, under the action of the spring 46, is held open from the valve seat 47 on the piston head 42. The valve stem is undercut at 67 to give a free path for the return fluid from the opposite side of the piston 42 through the passages 68. The outlet 48 from the cylinder 41 is connected to the control line 18 leading through the parking brake valve 19 to the anti-skid device 22.

The selector valve 50 reciprocates in the cylinder 51 which has the port 52 leading through the annular passage 52a to the connection 15 and the high pressure feed line 13 and the port 53 leading through the annular passage 53a to the connection 17 and the return line 14.

Figure 3:
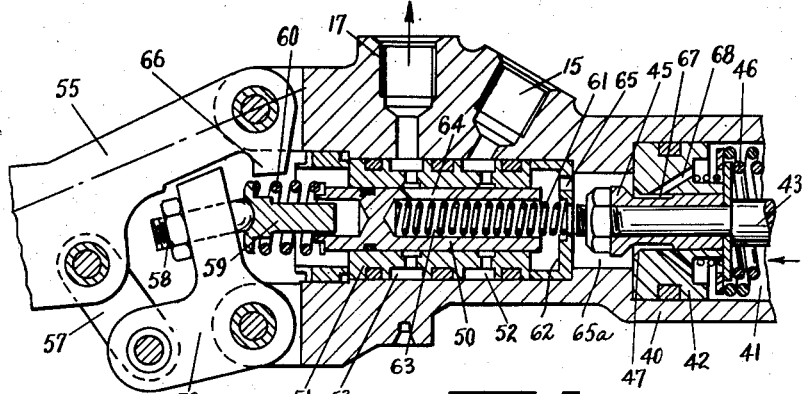
Figure 3 is a partial enlarged view of Figure 2 showing the pressure reducing valve and pedal operated lever in the retarded position as in Figure 2 and showing the return fluid flow passage open to allow the fluid to return freely to the system reservoir.
Figure 4:
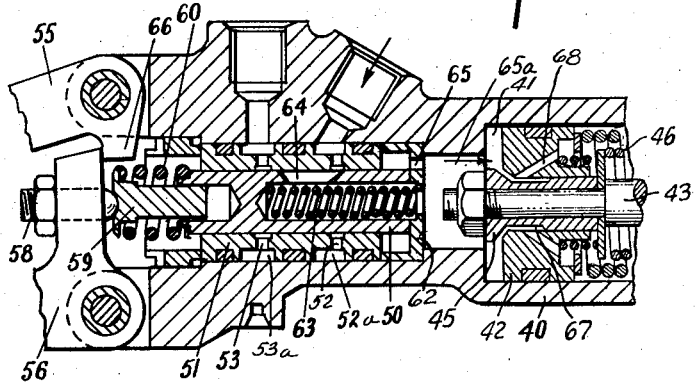
Figure 4 is a view similar to Figure 3 but showing the pedal operated levers depressed and the valve moved forward to open the passages to the flow of high pressure fluid from the system pressure source to effect increase of fluid pressure in the brake system.

The piston rod 43 is anchored at its outer end 54 to a member of the aircraft structure 43a while the remainder of the control valve 16 floats on the piston 42 and piston rod 43 and is connected at its opposite end through the pivoted lever 55 to the brake pedal mechanism 55a. A pivoted lever 56 is connected to the lever 55 by means of the link 57 and has the adjustable screw 58 bearing on the head of the pin 59. The valve 50 is held in floating balance in the cylinder 51 by means of the spring 60 interposed between it and the pin 58 while the spring 61 is interposed between the selector valve 50 and the cylinder end wall 62. The selector valve 50 has a hollow bore 63 within which the spring 61 is seated and is provided with the port 64 which communicate with the ports 53 when the assembly is retracted as shown in Figure 3 of the drawings. A port 65 in the end wall 62 of the cylinder 51 provides free access between the valve port 64 of the valve 50 and the space 65a between the end wall 62 and the head of the piston 42. In order to limit the travel of the selector valve 50 in relation to the cylinder 51 a stop 66 on the lever 55 interferes with and limits the travel of the lever 56 and any adjustment required at this point is effected by the adjustment screw 58.

Figures 5, 6:
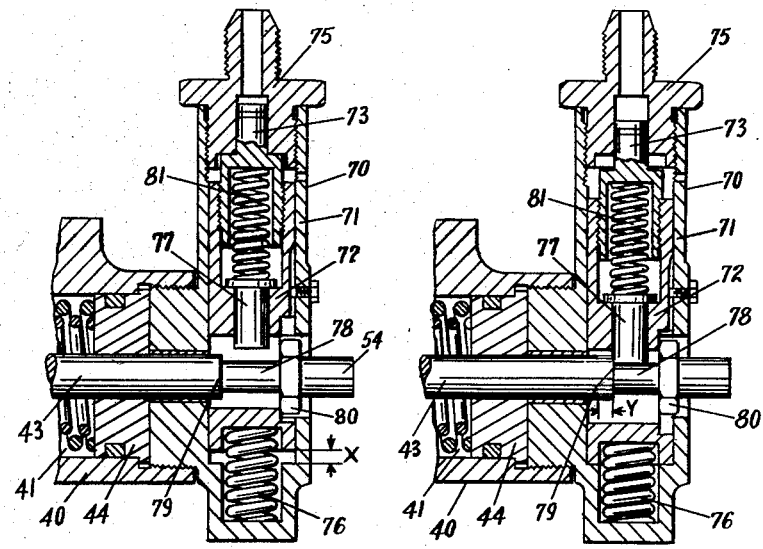
Figure 5 is a partial enlarged view of Figure 2 showing in detail the locking device with the locking pin withdrawn on failure of the high pressure fluid system.
Figure 6 is a view similar to Figure 5 but showing the locking device in normal position with high pressure fluid from the system pressure source in the system and allowing only fractional operation of the boost cylinder travel relative to the locked piston shaft.
Figure 7:
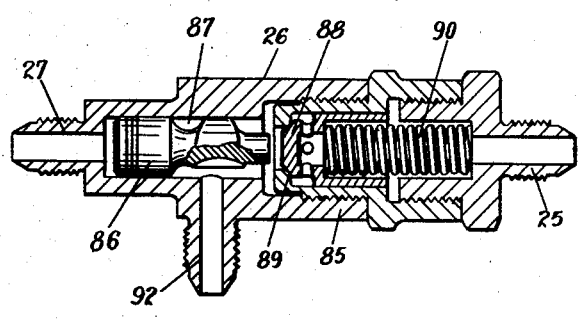
Figure 7 is a longitudinal sectional view of the control valve which cuts off the return fluid to the system reservoir on failure of the high pressure fluid system.

In order to limit the travel of the piston rod 43 and, in turn, limit the foot brake pedal travel, the boost cylinder brake valve above described has the locking assembly 70 fitted to it, which is operative at all times so long as the high pressure supply is available in the brake system. The assembly 70 comprises a cylinder 71 within which the piston 72 reciprocates with a limited travel "X." The reduced head 73 of the piston is exposed to the full pressure of the brake system through the pipe 74 leading from the inlet side of the brake valve 16 and the feed pipe 13 to the connection 75 which forms a cylinder head for the reduced piston head 73. The pressure in the feed line which is normally in the neighbourhood of 3000 p.s.i. is sufficient to force the piston 72 down against the pressure of the opposing spring 76 to close the travel gap "X." Downward travel of the piston 72 carries with it the spring loaded locking pin 77. This locking pin 77 connects the reduced diameter of the piston rod 43 at 78 between the shoulder 79 and the lock nut 80. It is only on failure of the high pressure brake fluid supply that the piston 72 will retract, as shown in Figure 5, under the pressure of the spring 76 and thereby allow the boost cylinder to be operated to its full capacity. The locking pin 77 is spring loaded by means of the spring 81.

In order to eliminate exhaust of the boost cylinder capacity under emergency conditions of failure of the high pressure fluid supply, a pressure operated valve 26 is inserted in the return line 24. The valve 26 comprises a body 85 having a connection 25 connected to the return line 24 from the anti-skid unit 22. A connection 27 is connected to the high pressure fluid feed line 13 and a connection 92 connected to the line 30. A piston 86 in the cylinder 87 is exposed to the high pressure fluid from the line 13 and is moved forward against the valve poppet 88, raising the valve from its seat 89 against the pressure of the spring 90 to provide a free return of fluid from the line 24 to the line 30 through the connection 92. However, on failure of the high pressure fluid at the back of the piston 86, the valve 88 will reseat on the seat 89 under pressure of the spring 90 to block the return line 24. The exhaust of the boost cylinder 41 is, thus prevented, by rendering the return flow from the anti-skid unit 22 inoperative. The full capacity of the boost cylinder is thus retained for emergency brake operation.

In order to prevent a "locked-on" condition of the wheel brakes under incipient skid conditions with the anti-skid unit inlet valve closed and the return fluid line 24 closed by the pressure operated valve 26, a check valve 29 is fitted in the line 28 which relieves the pressure from the brakes back to the boost cylinder on release of brake pedal force at the lever 55.

The high pressure fluid system is normally kept at about 3000 p.s.i. and this pressure fluid is supplied to the brake system via the boost-cylinder-type brake valves 16 which combines the function of a selector valve and a manually-operated brake cylinder. The selector valve section of the brake valve 16 is adjusted to give the required brake pressure of about 540 p.s.i. in the lines 18—20 leading from the brake valve 16 to the anti-skid unit 22 of the wheel brake assembly.

On failure of the 3000 p.s.i. supply system, manual operation of the boost piston produces an emergency pressure supply up to 200 p.s.i. from the boost cylinder. Under normal conditions of adjustment and bleeding of the brake lines, this system is considered satisfactory, the most frequent service complaint being excessive brake-pedal travel before achieving required brake pressure.

On the incorporation of an anti-skid device into the brake system certain problems arise, these are (a) The action of the anti-skid unit under conditions of incipient wheel-skid, of relieving and re-applying brake pressure, results in rapid exhaust of the boost cylinder capacity, causing equally rapid depression of the brake-pedal to the full travel extent, the available brake pressure then being reduced to the pressure-setting of the selector valve 50 of the brake valve 16 as adjusted by the adjusting screw 58 acting on the selector valve 50 through the spring 60, the rapid downward travel of the brake pedal under this condition being in itself considered to be a disconcerting feature of operation and (b) Under the emergency condition of failure of the 3,000 p.s.i. supply system, the action of the anti-skid unit rapidly (possibly within one second) exhausts the only available emergency hydraulic fluid, i.e., that contained in the boost cylinder, therefore, rendering the emergency feature of the boost cylinder type valve inoperative.

In the operation of this invention the improvements incorporated into the brake system effectively overcome the difficulties as above outlined and greatly add to the safety of operation of aircraft under emergency conditions.

Under normal operation conditions with the improved features of this invention, the 3,000 p.s.i. main fluid is supplied through the line 13 to the connection 15 of the brake valve 16, and through the branch connection 74 to the connection 75. Under static condition, where the brakes are not being operated, the selector valve 50 seals off the flow of fluid through the port 52, but the full 3,000 p.s.i. pressure flows through the connections 74 and 75, forcing the piston 72—73 down and carrying with it the locking pin 77. As the brake valve 16 is inoperative at the moment, the locking pin can travel down the full distance travel "X" as shown in Fig. 5. In this position of the locking pin 77, it rests on the piston rod 43 between the shoulder 79 and the lock nut 80. The possible travel of the piston rod 43 is now limited to that shown at "Y" in Fig. 6. The only variation from this condition would be prior to starting up the aircraft engines and before full application of brake feed pressure to the piston 72—73. Under this condition the spring 76 would force the piston 72—73 upwards carrying the locking pin 77 with it clear of the piston rod 43. This allows full operation of the brake valve 16 by the pilot prior to starting up. If the spring 81 were not used, the extension of the piston rod 43 prior to application of full pressure on the piston 72—73 would cause a heavy side load on the piston rod 43 when full working pressure is applied to the piston 73, possibly leading to failure of the piston rod 43 to return on release of the pilot-applied brake pedal. Provision of the spring 76 ensures that the maximum side load which can be applied to the piston rod is that applied by the spring.

Under these conditions when the high pressure fluid from the reservoir is available, the travel of the piston rod 43 is limited to travel "Y" and with the selector valve 50 adjusted to give the required operating pressure of 540 p.s.i. the brakes can be operated under all normal conditions either by the action of the anti-skid devices or by the pilot through the lever 55, causing the selector valve 50 to travel and bring its port 64 into registry with the port 52 to allow passage of the high pressure fluid through the port 65 into the space 65a between the end wall 62 and the head of the piston 42, closing the valve poppet 45 on its seat 47 and moving the piston 42 and piston rod 43 forward to the limit of travel "Y" allowed by the locking pin 77. Such action will ensure operation of the brakes under all normal conditions.

The lock device thus eliminates the downward travel of the brake pedal through the lever 55 on operation of the anti-skid unit 22, while the limited brake-pedal travel converts the normal brake operation to "pedal-force applications" and thus eliminates the "excessive brake-pedal-travel" complaint.

On failure of the 3,000 p.s.i. supply system, the pressure on the lock piston 72—73 is relieved and the piston is retracted under the action of the spring 76, carrying with it the locking pin 77 up clear of the shoulder 79 of the piston rod 43. This allows the capacity of the boost cylinder 41 to be utilized to the full for emergency operation of the brakes by manual force from the brake pedal lever 55 to boost piston 42.

In order to eliminate exhaust of the boost cylinder 41's capacity by action of the anti-skid device 22 during failure of the 3000 p.s.i. supply system, a pressure operated valve 26 is inserted in the return line 24 and 30 from the anti-skid unit 22. Under normal pressure, the valve poppet 88 is maintained in the open position under the action of the piston 86 which is subjected to the full 3000 p.s.i. through the connection 27 from the line 13, and the return flow from the anti-skid unit 22 through the line 24 is therefore free to pass from the connection 25 through the valve 88 and line 30 to the reservoir 10.

On failure of the 3000 p.s.i. supply pressure, the valve poppet 88 will close by the action of the spring 90, thus preventing exhaust of the boost cylinder 41 by rendering the return flow from the anti-skid device 22 to reservoir 10 inoperative, thereby retaining the capacity of the boost-cylinder 41 for emergency brake operation. The "locked on" condition of the brakes which could occur under this condition of operation (i.e. under incipient skid condition with the anti-skid unit inlet valve closed and return line closed by the pressure-operated valve 26) is prevented by incorporation of the check valves 29 which relieve pressure from the brakes back to the boost cylinder 41 on release of pedal force at the lever 55.

By the incorporation of the above described apparatus and the method of operation it is now possible to utilize all the advantages of an anti-skid device together with the valuable weight and complication saving advantages of the boost-type brake valve without the use of separate power brake valves and separate accumulators for emergency operation of the brakes with their additional pipe lines and necessary valves. The indication given to the pilot when additional travel of the brake pedal is available on failure of the high pressure fluid supply is of the utmost importance in indicating an emergency condition which would not otherwise be available to him without the installation of additional equipment.

What I claim is:

1. A hydraulic system for use with hydraulic brake applying means having anti-skid means cooperating therewith, comprising means including a first piston for delivering operating fluid to said anti-skid means and said brake applying means, means including a fluid source operatively connected with said delivering means for applying boosting fluid pressure to said first piston, means normally limiting the movement of said first piston operatively communicating with said means for applying boosting pressure, said limiting means by response to failure of said fluid pressure being rendered inoperative to limit said movement, means controlling the return of said fluid to said source from said anti-skid means, and means constituting a second closed hydraulic system comprising said delivering means and said controlling means, said controlling means being responsive to said failure to activate said second closed system.

2. A hydraulic system according to claim 1 wherein said limiting means includes piston means adapted to engage said first piston through response to said fluid pressure.

3. A hydraulic system according to claim 2 wherein said piston means includes a second spring biased piston.

4. A hydraulic system according to claim 3 wherein said second piston has a hollow interior, a third spring biased piston being mounted therein for engagement with said first piston.

5. A hydraulic system according to claim 1 wherein said controlling means includes a valve and means responsive to said fluid pressure to open said valve.

6. A hydraulic system according to claim 5 wherein said valve includes a spring biased valve closure member.

7. A hydraulic system according to claim 1 wherein said delivering means includes means communicating with said anti-skid means, and said second closed hydraulic system further comprises means connecting said communicating means and said returning means.

8. A hydraulic system according to claim 7 wherein said connecting means includes valve means controlling the flow of said fluid.

References Cited in the file of this patent
UNITED STATES PATENTS
2,676,465  Gladden _____ Apr. 27, 1954